(12) United States Patent
Lemmons

(10) Patent No.: US 7,444,656 B2
(45) Date of Patent: Oct. 28, 2008

(54) POST PRODUCTION VISUAL ENHANCEMENT RENDERING

(75) Inventor: Thomas Lemmons, Evergreen, CO (US)

(73) Assignee: Intellocity USA, Inc.

( * ) Notice: Subject to any disclaimer, the term of this patent is extended or adjusted under 35 U.S.C. 154(b) by 543 days.

(21) Appl. No.: 10/403,317

(22) Filed: Mar. 27, 2003

(65) Prior Publication Data

US 2004/0031062 A1 Feb. 12, 2004

Related U.S. Application Data

(63) Continuation-in-part of application No. 10/212,289, filed on Aug. 2, 2002.

(60) Provisional application No. 60/309,714, filed on Aug. 2, 2001.

(51) Int. Cl.
*H04N 7/025* (2006.01)
*H04N 7/10* (2006.01)
*H04N 5/445* (2006.01)
*G06F 13/00* (2006.01)
*G06F 3/00* (2006.01)

(52) U.S. Cl. .............................. 725/32; 725/34; 725/35; 725/40

(58) Field of Classification Search .................... 725/32, 725/34–35, 40
See application file for complete search history.

(56) References Cited

U.S. PATENT DOCUMENTS

| | | | |
|---|---|---|---|
| 5,264,933 A * | 11/1993 | Rosser et al. ................ 348/578 |
| 5,353,392 A | 10/1994 | Liquet et al. ................ 395/135 |
| 5,515,485 A | 5/1996 | Liquet et al. ................ 395/135 |
| 5,543,856 A | 8/1996 | Rosser et al. | |
| 5,794,210 A | 8/1998 | Goldhaber et al. ............ 705/14 |
| 5,929,850 A | 7/1999 | Broadwin et al. ........... 345/327 |
| 6,177,931 B1 | 1/2001 | Alexander et al. | |

(Continued)

FOREIGN PATENT DOCUMENTS

| FR | 2 730 837 A | 8/1996 |
|---|---|---|
| WO | WO 9115921 A | 10/1991 |
| WO | WO 9510919 | 4/1995 |

OTHER PUBLICATIONS

U.S. Appl. No. 10/041,881, filed Oct. 24, 2001, Rasmussen et al.

(Continued)

*Primary Examiner*—Hunter B. Lonsberry
(74) *Attorney, Agent, or Firm*—Schwegman, Lundberg & Woessner P.A.

(57) ABSTRACT

Disclosed is a method and system that renders enhancement images onto receptor sites of a scene of a pre-existing program. A receptor site defines an area of a scene onto which an enhancement image may be rendered and provides information that may include size, scale, rotation, perspective, contour and coloration. Rendering processes may be direct, planar, conformal, blended, or migrated and may produce photo-realistic images that appear to be a natural part of a scene. Selection of enhancements may be targeted or opportunistic and may employ secondary selection criteria including demographics, viewer preferences, pricing and other information. Receptor site identification may employ human or software resources, or a combination thereof. Receptor site information may be determined through human or software resources or a combination thereof and may include the acquisition of characteristics of a displayed object image that then may be applied to an enhancement image.

47 Claims, 14 Drawing Sheets

U.S. PATENT DOCUMENTS

| | | | |
|---|---|---|---|
| 6,240,555 | B1 | 5/2001 | Shoff et al. |
| 6,263,189 | B1 | 7/2001 | Reagor ........................ 455/40 |
| 6,297,853 | B1 * | 10/2001 | Sharir et al. ................. 348/589 |
| 6,308,327 | B1 | 10/2001 | Liu et al. ....................... 725/37 |
| 6,324,519 | B1 | 11/2001 | Eldering ....................... 705/14 |
| 6,357,042 | B2 | 3/2002 | Srinivasan et al. ............. 725/32 |
| 6,446,246 | B1 | 9/2002 | Suto |
| 6,493,872 | B1 * | 12/2002 | Rangan et al. ................. 725/32 |
| 2001/0023436 | A1 | 9/2001 | Srinivasan et al. .......... 709/219 |
| 2002/0010923 | A1 | 1/2002 | Pack et al. .................... 725/32 |
| 2002/0056090 | A1 | 5/2002 | Wagner et al. ................ 725/32 |
| 2002/0059117 | A1 | 5/2002 | Yoch et al. .................... 705/27 |
| 2002/0059590 | A1 | 5/2002 | Kitsukawa et al. ............ 725/36 |
| 2002/0112249 | A1 * | 8/2002 | Hendricks et al. ........... 725/136 |

OTHER PUBLICATIONS

U.S. Appl. No. 09/941,148, filed Aug. 27, 2001, Huber et al.
U.S. Appl. No. 10/046,618, filed Oct. 26, 2001, Markel et al.
U.S. Appl. No. 10/076,950, filed Feb. 12, 2002, Zenoni.
U.S. Appl. No. 10/103,545, filed Mar. 20, 2002, Reynolds et al.
U.S. Appl. No. 10/099,054, filed Mar. 13, 2002, Markel.
U.S. Appl. No. 10/357,155, filed Jan. 31, 2003, Markel.
U.S. Appl. No. 60/688,075, filed Oct. 17, 2003, Huber et al.
Aaron Giles, Transparency Notes, Aug. 19, 1994, http:www.mit.edu:8001/people/nocturne/etc/Transparency_notes.html.
International Preliminary Examination Report mailed Oct. 12, 2004.

* cited by examiner

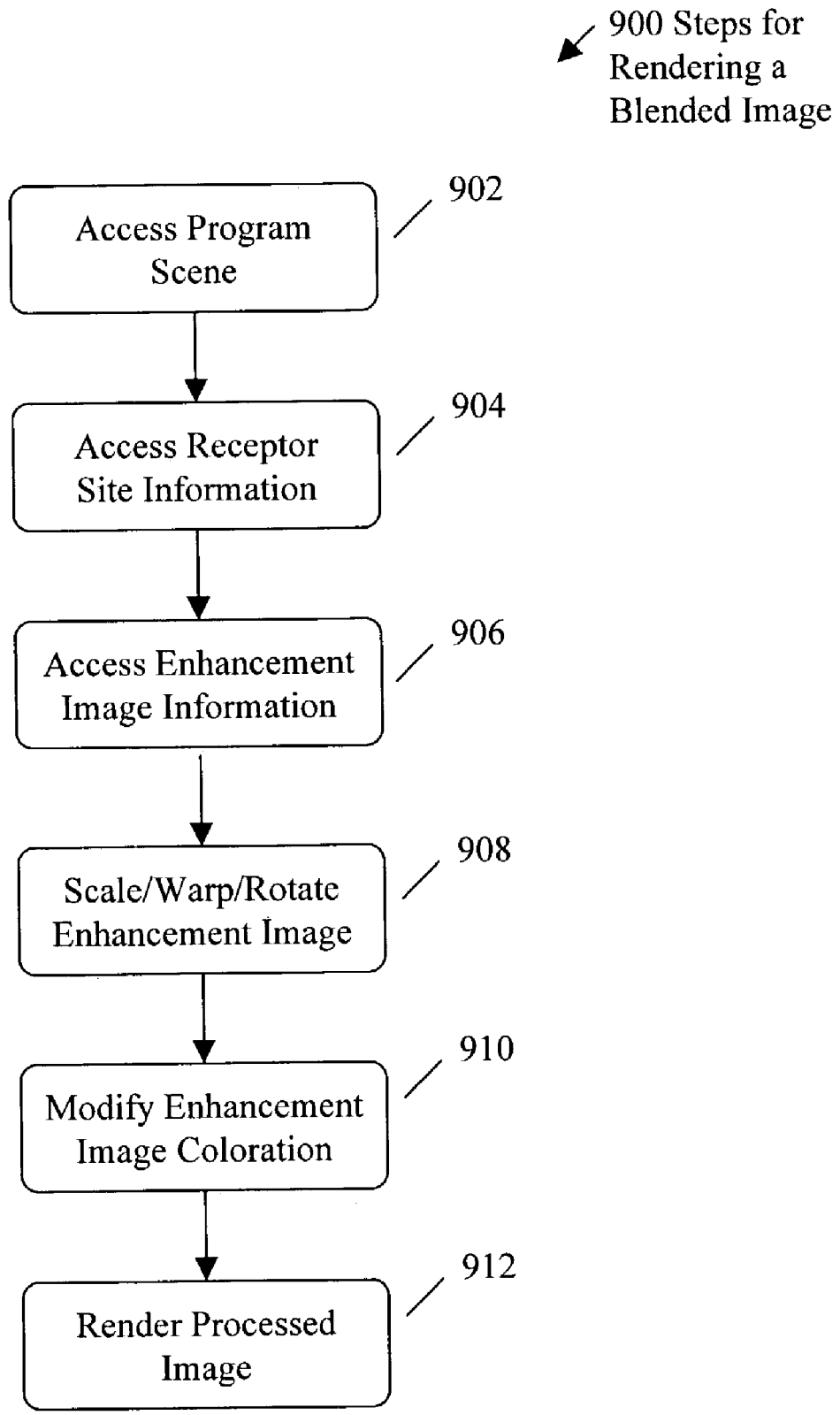

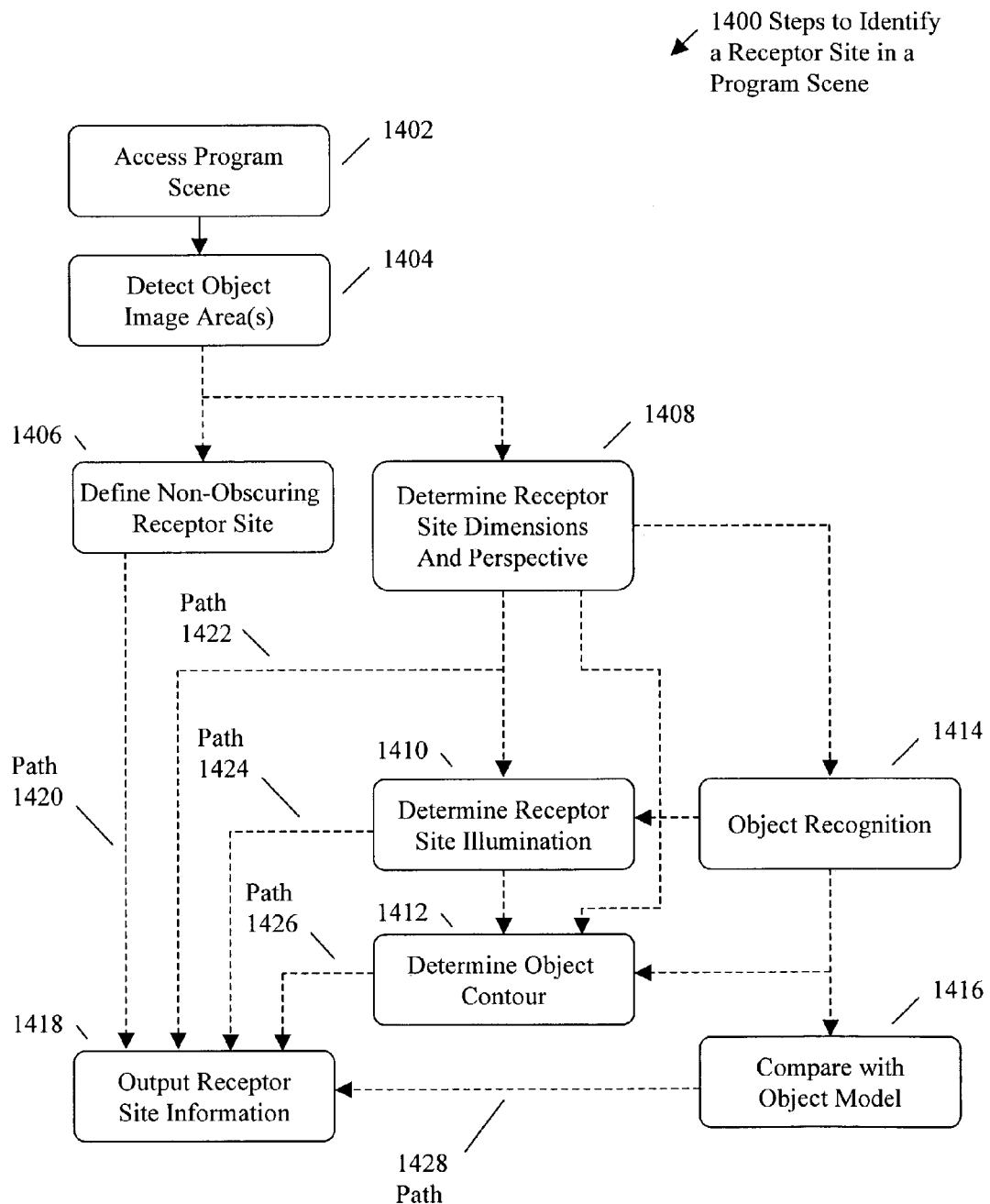

POST PRODUCTION VISUAL ENHANCEMENT RENDERING

CROSS REFERENCE TO RELATED APPLICATIONS

This application is a continuation-in-part of U.S. patent application Ser. No. 10/212,289, entitled "POST PRODUCTION VISUAL ALTERATIONS," filed Aug. 2, 2002 by Thomas Lemmons, which was based upon U.S. provisional patent application No. 60/309,714, entitled "POST PRODUCTION VISUAL ALTERATIONS," filed Aug. 2, 2001 by Thomas Lemmons, the entire disclosure of which is specifically incorporated herein by reference for all that it discloses and teaches.

BACKGROUND OF THE INVENTION a. Field of the Invention

The present invention pertains generally to television and streaming media video program presentation and more particularly to post-production visual enhancements and modifications applied to existing program content.

b. Description of the Background

A wide range of programs is provided through broadcast television, cable and satellite systems. Internet or other network presentation of such programs may likely increase in the future. Typically such broadcasts are commercial broadcasts where programs are accompanied by advertisements, commercial messages, previews and the like. Trends in the television industry include the advent of digital video recorders that allow viewers to easily skip advertising content. Additionally, viewers of non-recorded programs may change channels, do chores, get a snack, mute audio output, or otherwise stop viewing when commercial messages are presented. These trends reduce the viewing audience for advertising and the effectiveness of advertising messages. Therefore a new method of presenting advertising is needed.

SUMMARY OF THE INVENTION

The present invention overcomes the disadvantages and limitations of the prior art by providing a system and method of rendering visual enhancements onto scenes of an existing program. A scene that may comprise a sequence of video frames is analyzed to determine potential receptor sites for the placement of visual enhancements. Enhancement images, that may comprise advertising or other information, may be processed to produce a visually modified enhancement image that matches characteristics of the receptor site, such as the size, shape, color, perspective, and illumination of the receptor site. Image processing may be employed to alter an enhancement image such that a photo-realistic image is attained that appears to be a natural part of a scene. Such images may be employed to unobtrusively display products or product messages within program scenes.

The present invention may therefore comprise a method of rendering an enhancement image onto a scene of pre-existing program content comprising: detecting a receptor site for the enhancement; determining receptor site characteristics including type, size, and position of the receptor site; selecting the enhancement image from a plurality of enhancement images using the receptor site characteristics; processing the enhancement image employing a process that corresponds to the receptor site type and that produces a processed enhancement image; and rendering the processed enhancement image at the position of the receptor site.

The present invention may further comprise a method of rendering an enhancement image onto pre-existing content comprising: accessing a first database containing a plurality of enhancement images and information associated with the enhancement images including types of the enhancement images, selecting the enhancement image; accessing a second database containing a plurality of receptor sites and information associated with the receptor sites and selecting one receptor site of the plurality of receptor sites using the type of the enhancement image; processing the enhancement image responsive to the receptor site information to produce a processed enhancement image; and rendering the processed enhancement image at the receptor site.

The present invention may further comprise a method of rendering an enhancement image onto pre-existing content comprising: accessing a first database containing a plurality of receptor sites and information associated with the receptor sites including receptor site type, selecting one receptor site of said plurality of receptor sites; accessing a second database containing a plurality of enhancement images and information associated with the enhancement images including types of the enhancement images, selecting the enhancement image using the receptor site types of the one receptor site; processing the enhancement image responsive to the receptor site information of the one receptor site to produce a processed enhancement image; and rendering the processed enhancement image at the one receptor site.

The present invention may further comprise a method of identifying a receptor site in a scene of a program at which an enhancement image may be rendered comprising: accessing the scene of the program; recognizing an object in the scene; defining a receptor site in the scene based upon recognition of the object; and assigning a type to the receptor site.

The present invention may further comprise a system for rendering an enhancement image onto a scene of pre-existing program content comprising: first program code that detects a receptor site for the enhancement; second program code that determines receptor site characteristics including type, size, and position of the receptor site; third program code that selects the enhancement image from a plurality of enhancement images using the receptor site characteristics; fourth program code that processes the enhancement image using the receptor site characteristics to produce a processed enhancement image; and rendering program code that renders the processed enhancement image at the position of the receptor site.

Advantageously, embodiments of the present invention allow broadcasters to insert advertising into existing content to attain higher viewership of advertising messages and to tailor messages to a particular customer or demographic.

BRIEF DESCRIPTION OF THE DRAWINGS

In the drawings,

FIG. 9 is a flowchart of steps that may be employed to render a blended image.

FIG. 14 is a flowchart of steps that may be performed to identify a receptor site in a scene of a program.

DETAILED DESCRIPTION OF THE INVENTION

Figure 1:
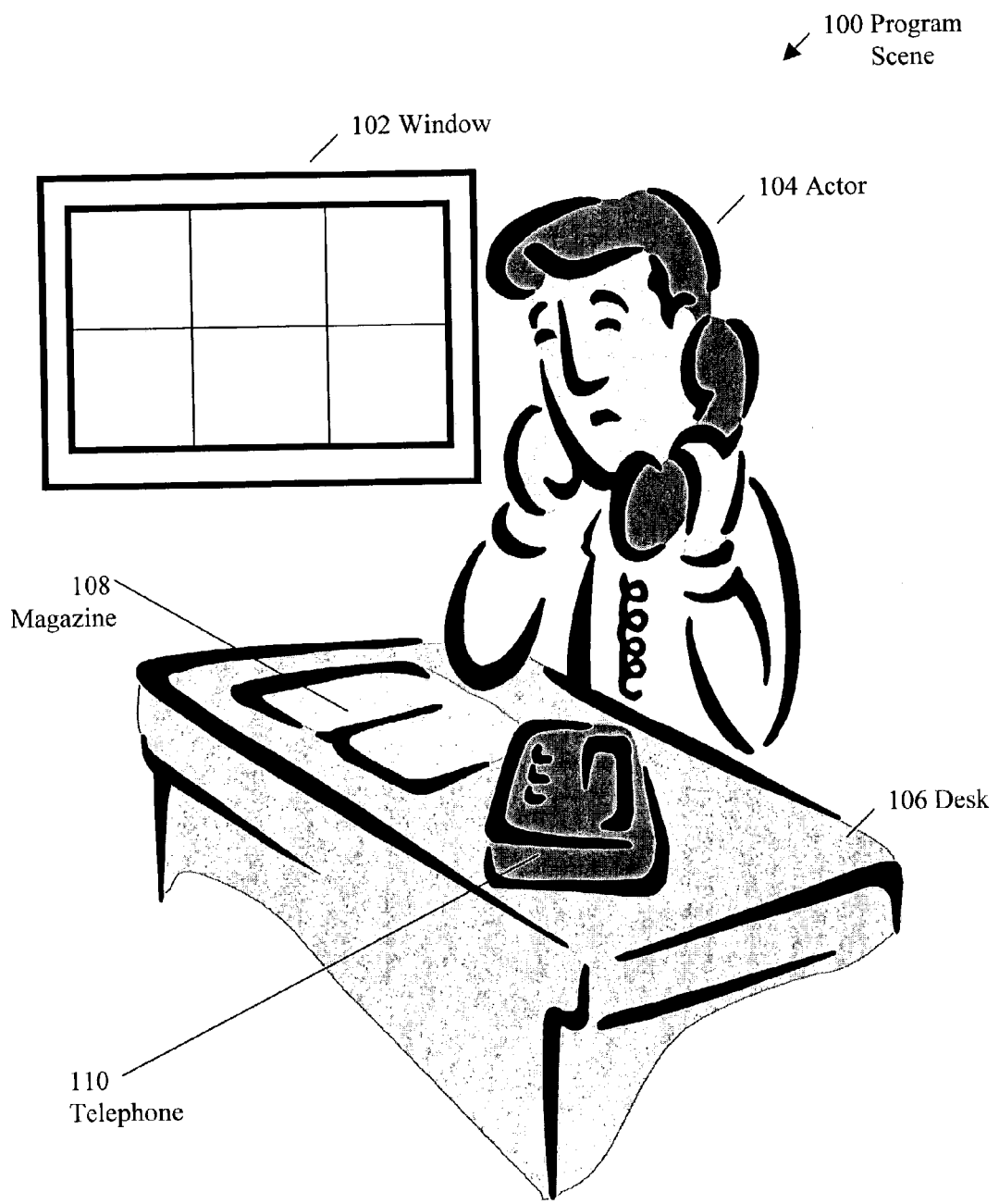
FIG. 1 is an illustration of a program scene to which a supplemental image may be applied.

FIG. 1 is an illustration of a program scene to which a supplemental image may be applied. Program scene 100 comprises window 102, actor 104, desk 106, magazine 108, and telephone 110. Embodiments of the present invention are directed to adding an enhancement image to existing program content such as program scene 100 of FIG. 1. Supplemental audio may also accompany the enhancement image. An enhancement image may be employed to provide additional information concerning displayed content or may be employed to add new information, such as advertising, for example. An enhancement image may be processed in a number of ways prior to being rendered. Such rendering processes may be termed as direct, planar, conformal, blended, or migrated. Advantageously, processed enhancement images may be employed to add commentary, advertising, humor, or other information that may increase viewer enjoyment and efficacy of advertising.

The selection, processing, and rendering of an enhancement image uses receptor site information. A receptor site is an area within a scene of a program where an enhancement image may be rendered and includes label spaces as disclosed in the patent application Ser. No. 10/212,289, entitled "POST PRODUCTION VISUAL ALTERATIONS," filed Aug. 2, 2002 by Thomas Lemmons. A "label space," is a space within the content (which may be a video stream) that is available for application of a label. A label may comprise any form of video enhancement, including video sequences, text, graphical images that may be in bitmap format or any other format, or other graphical representation. If the label is a "hot label," the viewer may then click on the hot label or otherwise activate a link associated with the label to access additional information.

Receptor site information may include size, perspective, type, illumination, and clipping information. Human operators, pattern recognition and other software, or a combination thereof, may be employed to identify a receptor site and to assign a type to the receptor site. A plurality of receptor sites may exist within one scene. Receptor site identification may be targeted or opportunistic. For targeted identification, a particular enhancement or set of enhancements is identified and program scenes are then inspected for a suitable receptor site. For opportunistic identification, scenes of a program are inspected for possible receptor sites and once identified, a database may be parsed to select an enhancement or group of enhancements that correspond to an identified receptor site type. Parsing of the database may employ receptor site type and size, or other information, to determine a set of "candidate" enhancements. Selection of a specific enhancement image may employ a range of processes and may use a combination of price, frequency, demographics, user preference, subscription type, type of service, or other information for selection. Such processes are termed secondary selection processes. Price information may be employed to select among possible enhancement images to maximize earnings. Price based selection of enhancements may be real-time or near real-time such that potential advertisers may "bid" on advertising opportunities. Methods may include those disclosed in U.S. Pat. No. 5,794,210 entitled "Attention Brokerage" issued Aug. 11, 1998 to Golhaber et al; and in U.S. Pat. No. 6,253,189 entitled "System and Method for Completing Advertising Time Slot Transactions" issued Jun. 26, 2001 to Freezell et al; and in U.S. Pat. No. 6,324,519 entitled "Advertisement Auction System" issued Nov. 27, 2001 to Eldering, all of which are specifically incorporated herein by reference for all that they teach and disclose.

Advertising enhancement selection may reflect user preferences or other information and may employ methods disclosed in U.S. provision patent application Ser. No. 60/420, 110 entitled "iChoose Video Advertising" filed Oct. 18, 2002 by Tom Huber and Thomas Lemmons, which is specifically incorporated herein by reference for all that it teaches and discloses. Frequency criteria may be employed to repeat advertising messages a predetermined number of times, such as may be used to promote product or brand name familiarity; or messages may be scheduled to occur in some order such that the viewer's interest or curiosity may be stimulated by having a changing array of messages presented. Demographic criteria may be employed to select messages tailored to a specific segment of the population, time of showing, program type, and the like.

Enhancement images may be "static" or animated and may be displayed for a predetermined duration, as may be expressed as a period of time or a number of frames of a presentation. Animation may include apparent motion and may include fade-in, fade-out, dissolve, sparkle or other effects. The position of an enhancement image may be varied during display. Enhancement images are not limited in format and may include GIF, TIFF, TIF, JPEG, bitmaps, motion JPEG, MPEG, three dimensional models, and other formats. Enhancement images may be rendered at a broadcast site or at the receiving site. Processing of enhancement images may occur at a broadcast site, at a receiving site, or both where tasks may be divided between the broadcast site and the receiving site.

Figure 2:
FIG. 2 is an illustration of an enhancement image applied to the scene of FIG. 1 employing direct rendering.

FIG. 2 is an illustration of a modified scene 200 with enhancement image 205 applied to the modified scene 200 of FIG. 1 employing direct rendering. In FIG. 2, modified program scene 200 comprises actor 204 and direct rendered enhancement image 205. Direct rendering refers to the enhancement image being rendered with little or no modification, such that little or no processing of enhancement image 205 is required. Rendering may comprise selection of an enhancement image that matches, nearly matches, or matches without exceeding the size of the receptor site. The enhancement image may be scaled to attain a desired size. In FIG. 2, direct rendered enhancement image 205 is employed to indicate the actor's thoughts. Direct rendered enhancements may be employed to add messages, humor, icons, logos, and other information.

Figure 3:
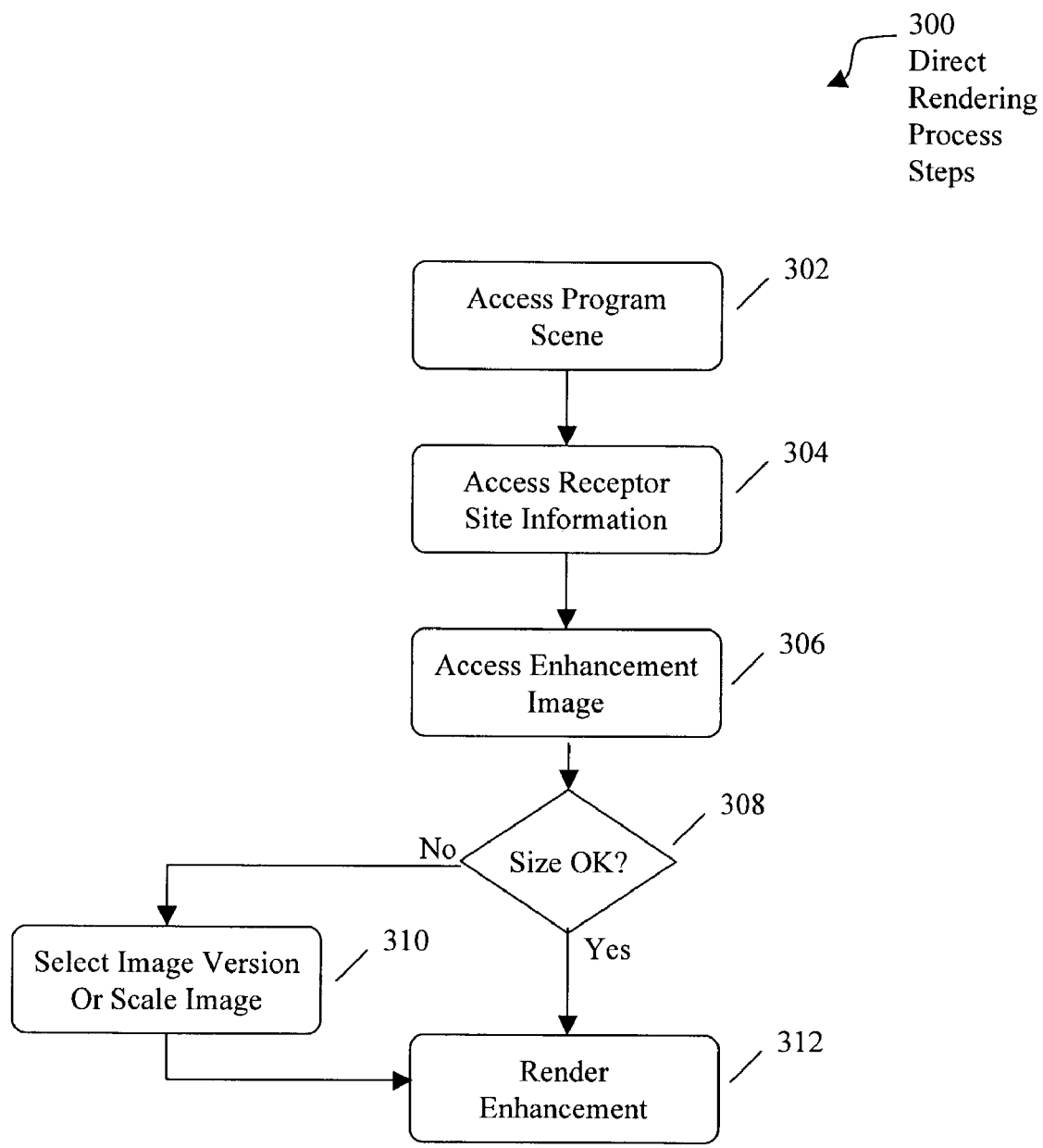
FIG. 3 is a flowchart of steps employed to direct render and enhancement image.

FIG. 3 is a flowchart of steps employed to directly render an enhancement image. Process 300 begins at step 302 where a scene of a program containing a suitable receptor site is accessed. As noted previously, receptor site identification may be deterministic or opportunistic. At step 304, receptor site information is accessed to determine the position and size of the receptor site. At step 306, enhancement image information is accessed. At step 308, a check is performed to determine if the size of the enhancement image is to be altered. This check may comprise comparing the enhancement image size with the receptor site size. If the check of step 308 determines that the size of the enhancement image does not need to be altered, processing continues at step 312 where the enhancement image is rendered. If the check performed at step 308 determines that the enhancement image size is to be altered, processing continues at step 310 where the image is scaled or clipped, or alternatively, if multiple versions of an enhancement image are provided, a version that corresponds to the receptor site size may be selected. Processing then continues at step 312 where the enhancement image is rendered. In another embodiment of the present invention, step 306 may comprise accessing an enhancement image from a plurality of images that corresponds to the size of the receptor site, or there may be only one enhancement image wherein the enhancement image is of the desired size, such that steps 308 and 310 are not employed. Enhancement image information may include how the enhancement image is to be rendered. Rendering is a process in which the enhancement image replaces or is combined with a portion of the program scene and is described below in greater detail.

Figure 4:
FIG. 4 illustrates a planar enhancement image applied to the scene shown in FIG. 1.

FIG. 4 illustrates a planar enhancement image applied to a scene 400. Planar enhancements are processed to conform to an apparent surface shown in a program scene. Receptor sites for planar images may correspond to windows, pictures, picture frames, signs, billboards, computer or television screens, panels in a stadium, or similar surfaces and areas. In FIG. 4, the modified program scene 400 comprises window 402, planar enhancement image 403, and actor 404. Planar enhancement image 403 is an "out of the window" scene containing an automobile. As shown in FIG. 4, a planar enhancement image 403 may be employed to promote product or brand familiarity. Planar enhancement images may be employed to generate humor, such as having a different scene out a window each time the window is shown, a different picture in a picture frame each time the picture frame is shown, or by showing humorous or nonsensical images. For example, scenes from an old sci-fi movie depicting aliens might be shown as a window scene to add humor to existing content. Planar enhancement receptor sites may correspond to two-dimensional surfaces such that image processing may employ two-dimensional scaling. Processing of planar enhancement images may also include color modification. For example, the intensity of an enhancement image may be modified to match or closely match the lighting conditions of a scene such that the rendered image appears as a natural part of the scene.

Figure 5:
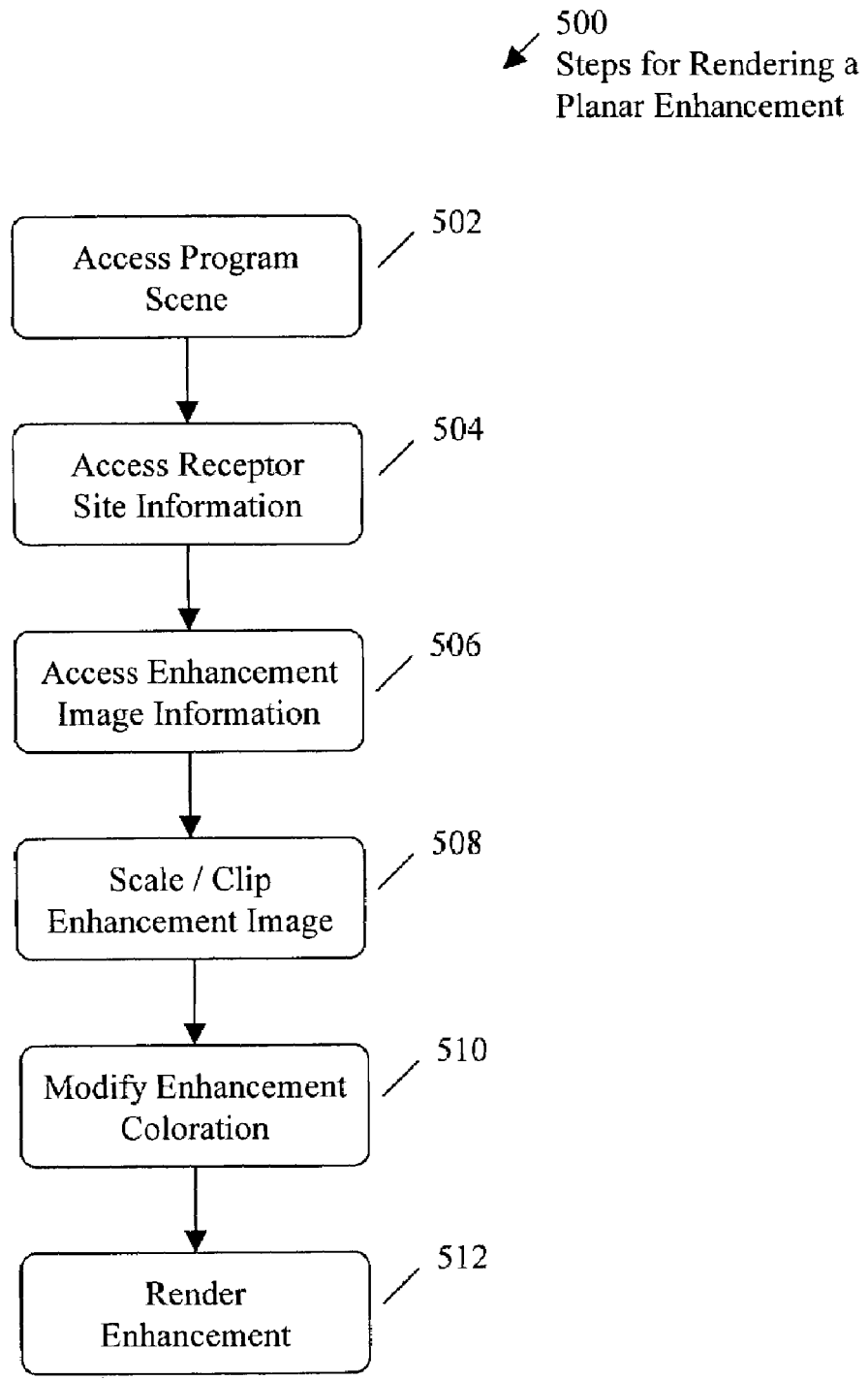
FIG. 5 is a flowchart of steps employed to render a planar enhancement.

FIG. 5 is a flowchart of the steps 500 employed to render a planar enhancement. At step 502, a scene of a program containing a suitable receptor site is accessed. At step 504, receptor site information is accessed to determine position, orientation, and dimensions of the receptor site. At step 506, enhancement image information is accessed. Enhancement image information may include how the enhancement image is to be combined with program content and if the enhancement image should be scaled or clipped. At step 508 the enhancement image is scaled or clipped employing information from step 504. At step 510 the scaled or clipped enhancement image may be color modified. At step 512 the processed enhancement image is rendered.

Figure 6:
FIG. 6 is an illustration of conformal enhancement images applied to the scene of FIG. 1.

FIG. 6 is an illustration of conformal enhancement images applied to an object already existing in a scene. In FIG. 6, modified program scene 600 comprises first conformal enhancement image 609 conformally rendered on magazine image 608 and second conformal enhancement image 611 conformally rendered on telephone image 610. The conformal enhancement images depicted in FIG. 6 illustrate how images in a program scene may be associated with a commercial product.

Figure 7:
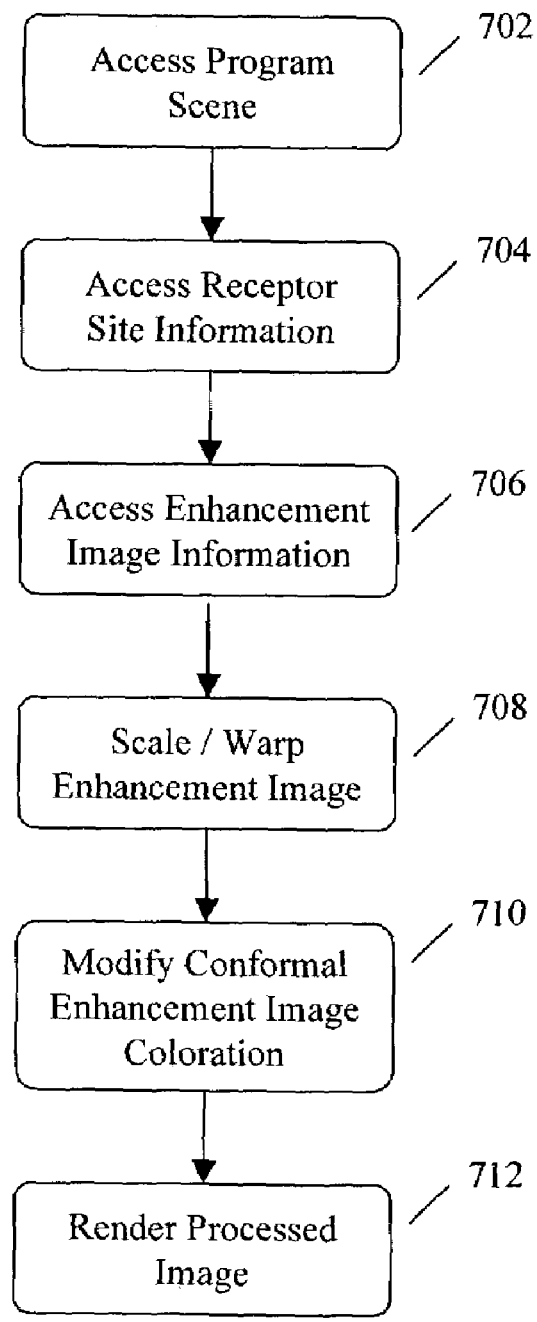
FIG. 7 is a flowchart of steps that may be employed to conformally map an enhancement image to an apparent object.

FIG. 7 is a flowchart of steps that may be employed to conformally map an enhancement image to an object already existing in a scene. Process 700 begins at step 702 where a scene of a program containing a suitable receptor site on an existing object is accessed. At 704, receptor site information is accessed to determine information including size, position, contour, and illumination. At step 706, enhancement image information is accessed. Enhancement image information may include how the enhancement image is to be combined with program content and what properties of the receptor site should be applied to the enhancement image, such as reflectivity, for example. At step 708, size and contour information of the receptor site are employed to scale and/or warp the enhancement image. Warping comprises non-linear scaling as may be employed to map a bit mapped image to a surface, such as a sphere or other curved surface for example. At step 710, illumination information is employed to modify the color of the enhancement image. Illumination information may comprise color, gradient, and reflectivity. Color in any of the embodiments of the present invention may be expressed as hue and saturation or may employ any other color spaces, including RGB, or Y-Cr-Cb for example. Gradient information may specify variation in color or intensity across the image. The enhancement image information accessed at step 706 may include information employed to control color modification. In one embodiment it may be desired that an enhancement image blend into the program scene and appear as if it were part of the original scene. In another embodiment it may be desired that the enhancement object stand out from the scene. Color information included as part of enhancement image information may override or take priority over color information associated with a receptor site. At step 712, the color-processed image is rendered at the receptor site. As previously noted, enhancement images may be animated. For example, the word "YUM" may be mapped to the surface of a pizza box that already contains pizza company information. The word "YUM" may be animated to appear for a predetermined duration and then be removed. The word "YUM" may dissolve, pop, shimmer, morph into a pizza delivery caricature and run away, or produce any other animated effect.

Figure 8:
FIG. 8 illustrates the application of a blended image to the program scene of FIG. 1.

FIG. 8 illustrates the application of a blended image to a program scene. A blended image is an image that is rotated and scaled, or warped, to match receptor site size and perspective, and that is color processed to correspond to illumination of the receptor site. Through this process, a blended image is a photo-realistic image that appears to be a natural part of a scene. A blended image may be employed to display advertising related objects or to introduce humor, game objects (find the golden key in scenes, for example) and the like. In FIG. 8, modified program scene 800 comprises blended enhancement image 807 rendered on desk 806. Blended enhancement image 807 is an image of a soft drink can that has been scaled, rotated, colored and inserted in the scene to appear as a natural part of the scene. The color processing of blended enhancement image 807 may include reflectivity where color from the receptor site or surrounding area may be used to define the color of the blended image. Advantageously, blended images allow product messages to be unobtrusively introduced into a scene without interrupting the flow of a program presentation. Blended images may be employed to place objects on desks, tables, walls, streets, buildings, and virtually anywhere in a scene that would appear to be a part of the scene. Billboards may be placed in outdoor scenes.

FIG. 9 is a flowchart of steps that may be employed to render a blended image. At step 902, a scene of a program containing a suitable receptor site is accessed. At 904, receptor site information is accessed to determine information including size, position, perspective, and illumination. At step 906, enhancement image information is accessed. Enhancement image information may include information relating to how the enhancement image is to be combined with program content and what properties of the receptor site should be applied to the enhancement image, such as reflectivity, for example. At step 908, size and perspective information of the receptor site are employed to rotate, scale and/or warp the enhancement image. At step 910, illumination information is employed to modify the color of the enhancement image to correspond to the illumination of the receptor site and may include reflectivity. At step 912 the processed image is rendered.

Figure 10A:
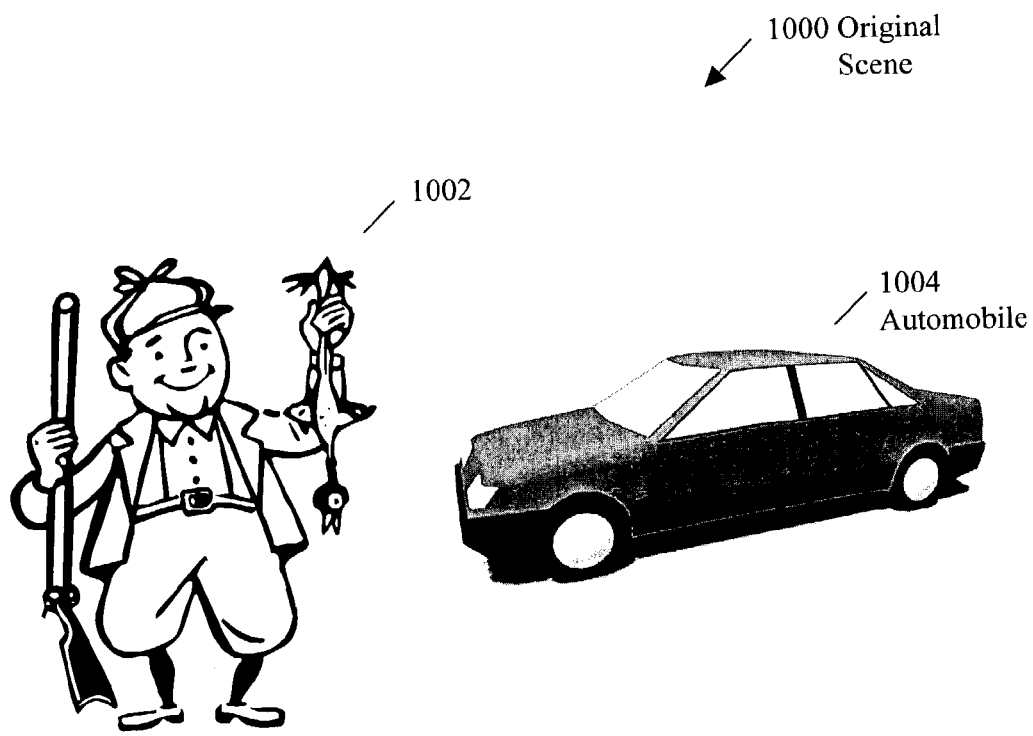
FIGS. 10A and 10B illustrate a program scene to which a migrated enhancement image may be applied.
Figure 10B:
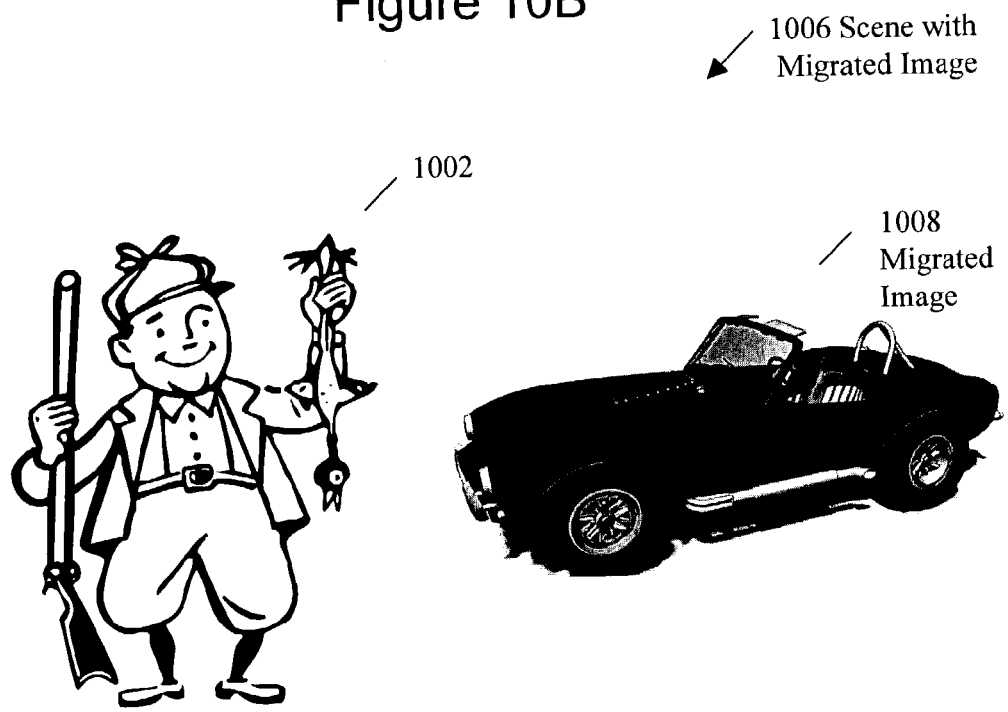

FIGS. 10A and 10B illustrate a program scene to which a migrated enhancement image may be applied. In FIG. 10A, the pre-existing scene 1000 comprises fisherman 1002 and automobile 1004. A migrated enhancement image employs a process where an object in a scene is recognized, characteristics of the image of the recognized object image are determined (such as illumination, scale, rotation, and warping, if any, for example) and then the characteristics are applied to an enhancement image such that the characteristics of the recognized object are "migrated" to the enhancement image. A model of the recognized object may be compared with the recognized object image to determine characteristics that the migrated enhancement image then "inherits". For example, the receptor site object model may include surface angle information such that reflectivity and illumination properties may be determined for one or more angles and then the reflectivity and illumination properties may then be applied to like or similar angles in an enhancement image model to produce a processed migrated image that has illumination and reflectivity that corresponds to the receptor site object image. FIG. 10B depicts a scene with a migrated enhancement image 1006 where the image of automobile 1004 of FIG. 10A and been replaced by a migrated image of automobile 1008. The illumination characteristics, scale, and rotation of the automobile 1004 of FIG. 10A have been applied to automobile 1008 of FIG. 10B. The "inheritance" of optical characteristics from a recognized object to an enhancement image allows the enhancement image to be rendered in a manner that conforms to the pre-existing scene while limiting the amount of manual editing required. The methods of FIGS. 10A and 10B do not require that an existing image be replaced by an enhancement image. The properties of an existing image may be migrated to an enhancement image that is adjacent to the existing image or elsewhere in the scene.

Figure 11:
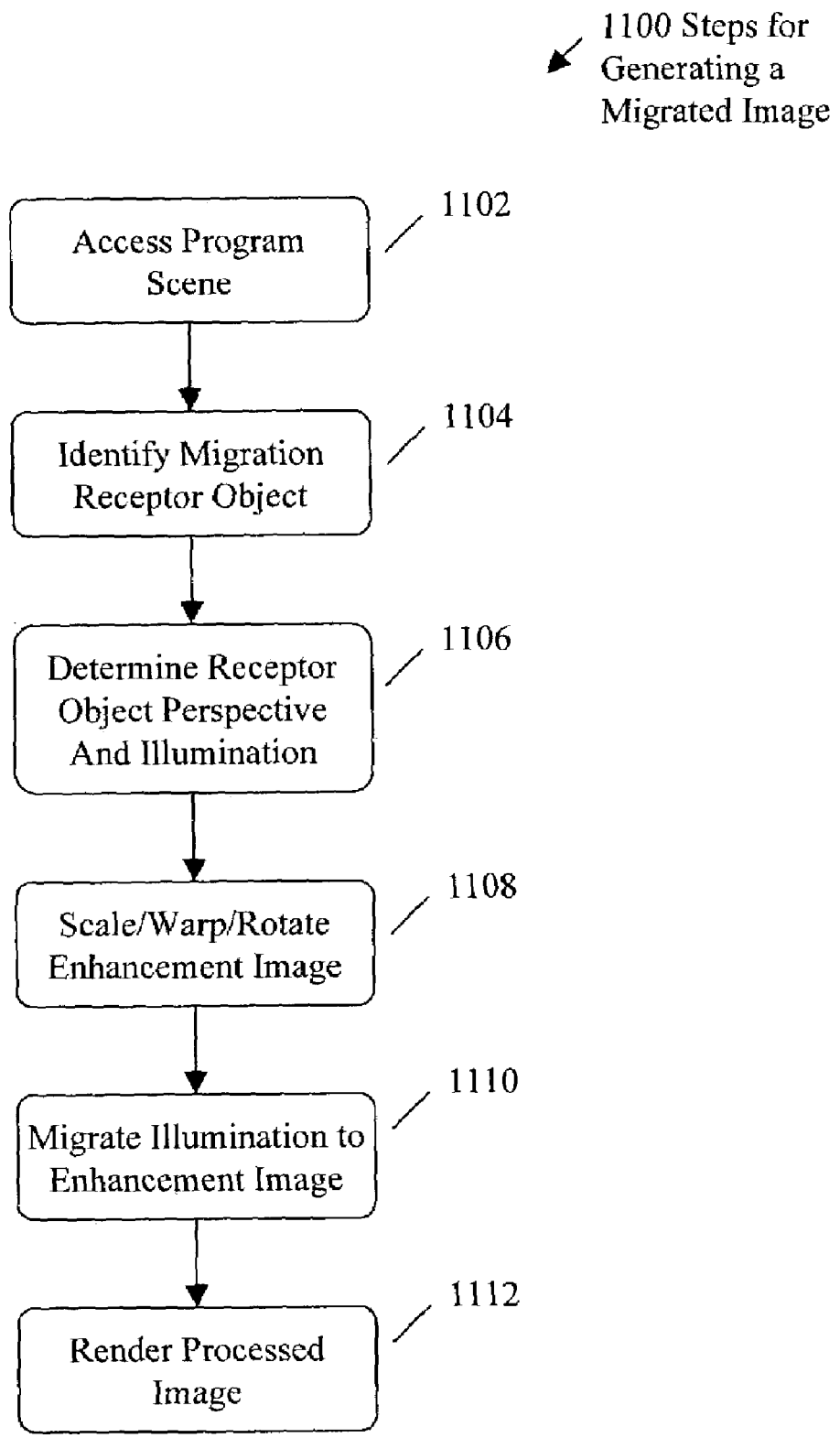
FIG. 11 is a flowchart of steps performed in migrating the characteristics of a displayed object to an enhancement image.

FIG. 11 is a flowchart of steps performed in migrating the characteristics of a displayed object to an enhancement image. At step 1102, a program scene is accessed. At step 1104, a migration receptor object is identified. At step 1106, characteristics of the receptor object are determined. Such a determination may comprise comparing the receptor object image to a model of the object and determining scale, rotation, perspective, and illumination. At step 1108, the scale, rotation, and perspective characteristics determined in step 1106 are applied to and enhancement image. At step 1110 the illumination characteristics determined in step 1106 are applied to the enhancement image. At step 1112 the processed image is rendered.

As noted previously, receptor site identification may be targeted or opportunistic. Targeted receptor site identification may be employed when it is desired that a predefined set of enhancement images be rendered in a program. For example, if a company sponsors a program, the company may desire that one or more of their products be promoted through enhancement images rendered in program scenes. A database may contain a predefined set of images targeted to the program.

Figure 12:
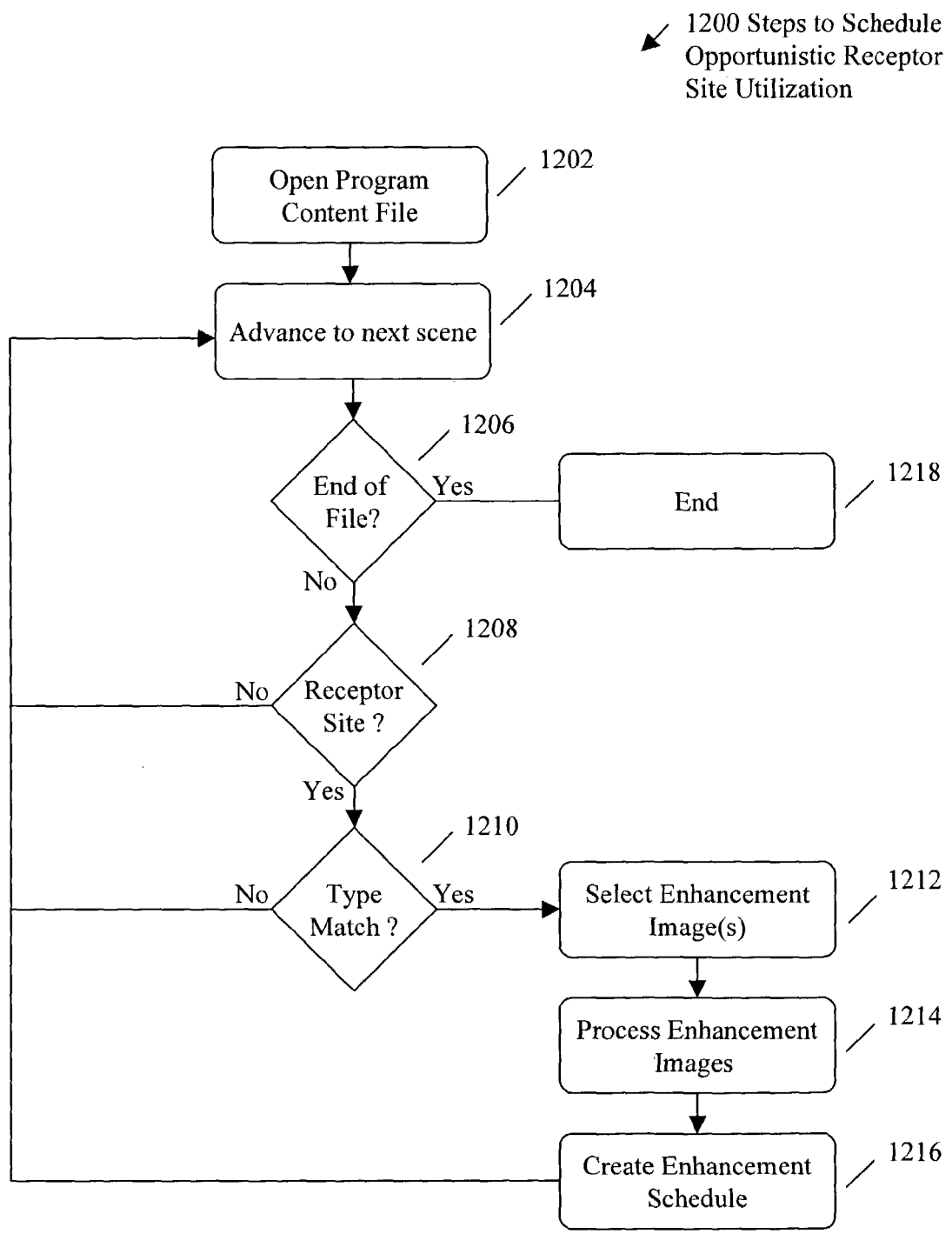
FIG. 12 is a flowchart of steps performed to schedule opportunistic receptor site utilization.

FIG. 12 is a flowchart of steps 1200 performed to schedule opportunistic receptor site utilization. At step 1202, a program content file is opened. At step 1204, the file is advanced to the next scene. At step 1206, a check is performed to determine if the end of the program content file has been reached. If the end of the file has not been reached processing continues at step 1208 where a check is performed to determine if the scene contains a receptor site. If the scene does not contain a receptor site, processing continues at step 1204. If the check of step 1208 determines that the scene contains a receptors site, processing continues at step 1210 where a check is performed to determine if the receptor site type corresponds to an enhancement type in a database. If a type match does not exist, processing continues at step 1204. If a type match does exist, processing continues at step 1212 where an enhancement image is selected. Selection of the enhancement image may employ any of the aforementioned methods and may include parsing a database and using secondary selection processes. At step 1214, the selected enhancement image is processed employing any of the methods disclosed. At step 1216, display of the processed enhancement image is scheduled. Processing as described in steps 1204 through 1216 continues until step 1206 determines that the end of the program content file has been reached and the process stops at step 1218.

Figure 13:
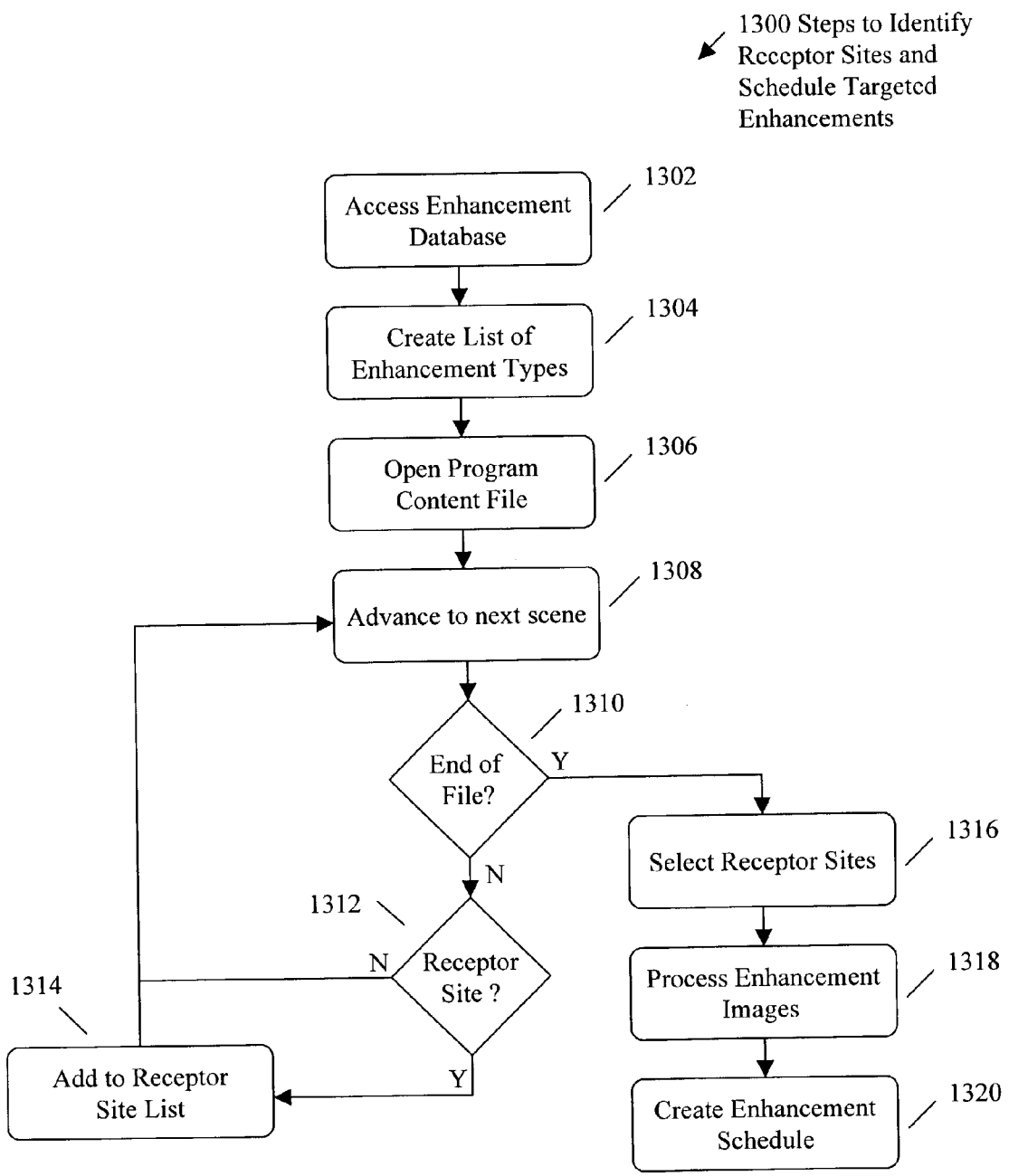
FIG. 13 is a flowchart of steps that may be performed to identify receptor sites and to schedule targeted enhancements.

FIG. 13 is a flowchart of steps that may be performed to identify receptor sites and to schedule targeted enhancements. At step 1302, a database containing a predefined set of enhancement images is accessed. The enhancement image database may include data categories of information such as type of enhancement, size, and duration if animated, for each enhancement. At step 1304, a list of enhancement types is created. At step 1306, a program content file is opened. At step 1308, the program content file is advanced to the next scene. At step 1310, a check is performed to determine if the end of the program content file has been reached. If the end of the file has not been reached, processing continues at step 1312 where a check is performed to determine if the scene contains a receptor site. If the scene contains a receptor site, processing continues at step 1314 where the receptor site and associated information are added to a site list. Processing then continues at step 1308. If the check performed at step 1312 determines that a receptor site does not exist in the scene, processing continues at step 1308. Steps 1308 through 1314 or 1308 through 1312 may be performed a number of times until the end of the program content file is reached. When step 1310 determines that the end of the program content file has been reached, processing continues at step 1316 where receptor sites and enhancements are selected. At step 1316, the list of receptor sites is parsed and receptor sites that conform to the targeted enhancements are selected.

In one embodiment of the invention, all receptor sites that correspond to the targeted enhancements may be used. In another embodiment of the present invention, less than all of the receptor sites of the list may be used and selection of the receptor sites may include presentation criteria. Presentation criteria may include the ranking of the receptor sites for duration of enhancement display, elapsed time or number of frames between receptor sites of the same type, as may be employed to either show a similar enhancement a number of times in a short period to create a viewer impression, or alternatively, spacing out the showing of a type of enhancement over a longer duration. Presentation criteria may also include the order in which enhancements are shown. For example, in a program that contains automobiles, enhancements shown early in the program may comprise models that an advertiser wants most to present under the assumption that some viewers will not watch the program in its entirety. Employing the receptor site list of step 1314, presentation criteria, and the enhancements database accessed in step 1302, enhancements are assigned to each selected receptor site and processing continues at step 1318. At step 1318, the enhancements associated with each selected receptor site of step 1316 are processed. Processing may include any of the disclosed methods. Other methods may be applied to those shown in the figures such as employing receptor site duration to determine fade-in or fade-out time, rate of animation and the like. At step 1320, an enhancement schedule may be is created. The enhancement schedule specifies the enhancement and receptor site for each enhancement.

Variations of the processes described in FIGS. 12 and 13 are possible where real-time or near real-time selection and processing of images may occur. For example, a database may be organized (sorted or otherwise prioritized) to indicate an order in which each enhancement or type of enhancement is to be presented. As receptor sites are identified, enhancements maybe selected from the database and may be processed and rendered.

FIG. 14 is a flowchart of steps that may be performed to identify a receptor site in a scene of a program. Receptor site identification methods may employ hardware, software, and human resources exclusively or in any combination. Identification processes may reflect the type or types of enhancements to be rendered. Flowchart 1400 comprises paths 1420, 1422,1424,1426,1428 that provide receptor site determination as may be utilized in FIGS. 2-11. At step 1402, a program scene is accessed. Scenes may be identified by an operator or may be identified automatically through comparison of a sequence of frames to determine amount of change. Methods may include, but are not limited to, those disclosed in U.S. Provisional Application Ser. No. 60/268,350, filed Feb. 12, 2001 entitled "VIDEO TAGS AND MARKERS", now U.S. Non-Provisional application Ser. No. 10/076,950, filed Feb. 12, 2002, both of which are specifically incorporated herein by reference for all that they disclose and teach.

Once a program scene is accessed at step 1402, processing continues at step 1404 where object image areas are detected. Detection may employ human or computer resources or a combination thereof. For example, object image detection may employ pattern recognition software and an operator may select specific processing routines or areas of the scene to be processed. Object area information from step 1404 maybe supplied to step 1406 where an area of the scene that does not obscure relevant content is defined. Information from step 1406 is then passed to step 1418 where receptor site information is output. Steps 1402, 1404, 1406, and 1418 may be employed to create receptor site information for direct rendered enhancements as indicated by path 1420 in FIG. 14. Information from step 1404 may be provided to step 1408 where the dimensions and perspective of a receptor site are determined. The information from step 1408 may be provided to step 1418 where receptor site information is output. Steps 1402, 1404, 1408, and 1418 may be employed to create receptor site information for planar rendered enhancements as indicated by path 1422 in FIG. 14. Planar rendered enhancements may also employ illumination formation such that the rendered image conforms to lighting conditions of the scene and appears to be a natural part of the scene. Steps 1402, 1404, 1408, 1410, and 1418 may be employed to create receptor site information for color modified planar rendered enhancements as indicated by path 1424 in FIG. 14. The information determined at step 1408 may be provided to step 1412 where contour information is determined. Contour information may be extracted through software or human resources or a combination thereof. Steps 1402, 1404, 1408, 1412, and 1418 may be employed to create receptor site information for conformally rendered enhancements. Alternatively, receptor site information may include illumination information and steps 1402, 1404, 1408, 1410, 1412, and 1418 may be employed to create receptor site information for blended rendered images as indicated by path 1426. Alternatively, contour information may employ object recognition step 1414 and step 1414 may provide object recognition information to step 1410 where receptor site illumination is determined or to step 1412 where contour information is determined wherein these processing paths also produce receptor site information for conformally rendering or blending an enhancement image. The output from step 1414 may be supplied to step 1416 where the object image recognized in step 1414 may be compared with a model of the object to determine image characteristics that then may be migrated to an enhancement image. Steps 1402, 1404, 1408, 1414, 1416, and 1418 as indicated by path 1428 may be employed to create receptor site information for migrated images. The steps of FIG. 14 may be applied for each frame of a scene. Changes from frame to frame of a scene may be separately saved, or an equation may be derived which describes the changes from frame to frame. A scene may contain a plurality of receptor sites and these receptor sites may be of the same type or may be of different types.

The position of a receptor site may change over time or from frame to frame of a program. Recognition and identification may also employ methods as disclosed in U.S. Provisional Application Ser. No. 60/354,745, filed Feb. 6, 2002 entitled "TRACKING MOVING OBJECTS ON VIDEO WITH INTERACTIVE ACCESS POINTS", now U.S. Non-Provisional application Ser. No. 10/357,155, filed Jan. 31, 2003 entitled "TRAKING MOVING OBJECTS ON VIDEO WITH INTERACTIVE ACCESS POINTS," which are specifically incorporated herein by reference for all that they disclose and teach.

As noted previously, rendering of enhancements may take place at a broadcast site or at a receiver site. Processing of enhancement images may occur at a broadcast site, a receiver site, or both. When enhancements are rendered at a receiver site, they may be broadcast along with a program and may be broadcast as separate data packets, during blanking intervals, or on other channels. Alternatively, enhancements may be accessed across a network. Information contained within a broadcast stream may describe when enhancements are to be rendered and may employ methods including those of tags and markers as disclosed in U.S. Provisional Application Ser. No. 60/268,350, filed Feb. 12, 2001 entitled "VIDEO TAGS AND MARKERS", now U.S. Non-Provisional application Ser. No. 10/076,950, filed Feb. 12, 2002, both of which are specifically incorporated herein by reference for all that they disclose and teach.

Rendering of enhancement images comprises replacing or combining the existing program scene with the enhancement image. The manner in which an enhancement image is combined with pre-existing program content may employ any hardware or software methods and may include bit-BLTs (bit block logic transfers), raster-ops, and any other logical or mathematical operations including but not limited to maxima, minima, averages, gradients, and the like. Such methods may also include determining an intensity or color of an area of a receptor site or other area and applying the intensity or color to an enhancement image. A color or set of colors may be used to specify which pixels of a program scene are to be replaced by or to be combined with an enhancement image. Single color control of image replacement is often referred to as color keying, "blue screen" or chroma-key where a pixels of a predetermined color in the existing program scene are replaced by pixels of the enhancement image. In a similar manner, a predetermined range of colors or a set of colors may be employed to enable or disable display of enhancement image in pixel positions of the existing scene that are of a color contained in the predetermined range or set of colors. For example, a set of flesh tones may be specified such that portions of an enhancement image do not replace the image of a person in existing content, allowing the background behind the person to be changed. Rendering may also employ a mask that defines which areas of the program scene are to be combined with or replaced by an enhancement image. The mask may be a single bit per pixel, specifying replacement, or may comprise more than one bit per pixel wherein the plurality of bits for each pixel may specify the manner in which the program scene and the enhancement image are combined, such as mix level or intensity, for example. The mask may be implemented as part of a markup language page, such as HTML or XML, for example, or may be implemented as software code that generates the mask in a receiving unit that may comprise a set top box, satellite receiver, interactive television, computer, or any other device capable or implementing the present invention. Masks may be used in combination with color keying. Any of the processing methods disclosed herein may further include processes that produce blurs to match receptor site focus or motion blur. Processing methods may also include processes to match "graininess" of the pre-existing program. As mentioned above, enhancements are not limited in format and are not limited in methods of combination with program content. Methods employed may include those disclosed in U.S. Provisional Application Ser. No. 60/278,669, filed Mar. 20, 2001 entitled "DELIVERY OF INTERACTIVE VIDEO CONTENT USING FULL MOTION VIDEO PLANES", now U.S. Non-Provisional application Ser. No. 10/103,545, filed Mar. 20, 2002 entitled "VIDEO COMBINER", both of which are specifically incorporated herein by reference for all that they discloses and teach.

As previously noted, enhancements may reflect various demographics and may reflect user preferences. Such preferences may be established through menus or other interfaces, or may reflect the user interface itself, such as a personal remote control device, for example, and may employ methods disclosed in U.S. Provisional Application Ser. No. 60/227,916, filed Aug. 25, 2000 entitled "PERSONALIZED REMOTE CONTROL" now U.S. Non-Provisional application Ser. No. 09/941,148, filed Aug. 27, 2001 having the same title, both of which are specifically incorporated herein by reference for all that they discloses and teach.

The enhancement images disclosed herein may also be interactive where selection of the enhancement with a user input device spawns another action, such as but not limited to, opening a window and displaying information in the window, overlaying additional information onto the program display, altering the method in which enhancements are presented, or producing an audio output that may be alternate language, humor, commentary, sound effects, or other audio. Interactive enhancements, also referred to as hotspots, may be employed for games, contests, or other viewer interaction. Awards may be associated with viewer interaction and awards or reward programs may employ methods disclosed in U.S. Provisional Application Ser. No. 60/243,506, filed Oct. 26, 2000 entitled "COLLECTION OF AFFINITY DATA FROM TELEVISION, VIDEO, OR SIMILAR TRANSMISSION", now U.S. Non-Provisional application Ser. No. 10/046,618, filed Oct. 26, 2001 having the same title, and also disclosed in U.S. Provisional Application Ser. No. 60/275,295, filed Mar. 13, 2001 entitled "AFFINITY MARKING FOR INTERACTIVE TELEVISION", now U.S. Non-Provisional application Ser. No. 10/099,054, filed Mar. 13, 2002 entitled "AFFINITY MARKETING FOR INTERACTIVE MEDIA SYSTEMS", all of which are specifically incorporated herein by reference for all that they discloses and teach.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for rendering an enhancement image onto a scene of pre-existing program content, comprising:
   detecting a receptor site for said enhancement;
   determining a size of said receptor site;
   selecting said enhancement image from a plurality of enhancement images based on said size of said receptor site;
   accessing enhancement image information;
   processing said enhancement image based on said enhancement image information; and
   rendering said processed enhancement image at said receptor site based on said selected enhancement image information.

2. The method of claim 1 wherein said step of detecting a receptor site further comprises:
   receiving an input from an operator viewing said scene.

3. The method of claim 1 wherein said step of detecting a receptor site further comprises:
   applying an image recognition software program to said scene.

4. The method of claim 1 wherein said step of processing said enhancement image further comprises:
   scaling said enhancement image.

5. The method of claim 1 wherein said step of processing said enhancement image further comprises:
   rotating said enhancement image.

6. The method of claim 1 wherein said step of processing said enhancement image further comprises:
   warping said enhancement image.

7. The method of claim 1 wherein said step of processing said enhancement image further comprises:
   warping said enhancement image to conform to the contour of a recognized object.

8. The method of claim 1 wherein said step of determining a receptor site characteristic comprises:
   determining a coloration characteristic of said receptor site.

9. The method of claim 8 wherein said step of processing said enhancement image further comprises:
   applying said coloration characteristics characteristic to said enhancement image.

10. A method for rendering an enhancement image onto pre-existing content comprising:
   accessing a first database containing a plurality of enhancement images and information associated with said enhancement images including types of said enhancement images;
   selecting said enhancement image;
   accessing, after the step selecting said enhancement image, a second database containing a plurality of receptor sites and information associated with said receptor sites;
   selecting a receptor site from said plurality of receptor sites based on said type of said enhancement image;
   accessing enhancement image information for selecting either a receptor site property or an enhancement image property;
   processing said enhancement image based on said receptor site information; and
   rendering said processed enhancement image at said receptor site based on said enhancement image information.

11. The method of claim 10 wherein said step of processing said enhancement image further comprises:
   scaling said enhancement image.

12. The method of claim 10 wherein said step of processing said enhancement image further comprises:
   rotating said enhancement image.

13. The method of claim 10 wherein said step of processing said enhancement image further comprises:
   warping said enhancement image.

14. The method of claim 10 wherein said step of processing said enhancement image further comprises:
   warping said enhancement image to conform to the contour of a recognized object.

15. The method of claim 10 wherein said step of processing said enhancement image further comprises:
   applying a coloration characteristic of said receptor site to said enhancement image.

16. A method for rendering an enhancement image onto pre-exist1ng content comprising:
   accessing a first database containing a plurality of receptor sites and information associated with said receptor sites including sizes of said receptor sites;
   selecting a receptor site from said plurality of receptor sites;
   accessing a second database containing a plurality of enhancement images and information associated with said enhancement images including types of said enhancement images;
   selecting an enhancement image from said plurality of enhancement images based on said size of said receptor site;
   accessing enhancement image information;
   processing said enhancement image based on said enhancement image information; and
   rendering said processed enhancement image at said receptor site based on said enhancement image information.

17. The method of claim 16 wherein said step of processing said enhancement image further comprises:
   scaling said enhancement image.

18. The method of claim 16 wherein said step of processing said enhancement image further comprises:
   rotating said enhancement image.

19. The method of claim 16 wherein said step of processing said enhancement image further comprises:
   warping said enhancement image.

20. The method of claim 16 wherein said step of processing said enhancement image further comprises:
   warping said enhancement image to conform to the contour of a recognized object.

21. The method of claim 16 wherein said step of processing said enhancement image further comprises:
   applying a coloration characteristic of said one receptor site to said enhancement image.

22. A method for identifying a receptor site in a scene of a program at which an enhancement image may be rendered comprising:
   accessing said scene of said program;
   recognizing an object in said scene, said object having an object characteristic;
   defining a receptor site in said scene based upon recognition of said object; and assigning a type to said receptor site;
   determining a receptor site characteristic of said receptor site based on said object characteristic;
   selecting an enhancement image from a plurality of enhancement images using said receptor site characteristic;
   accessing enhancement image information;
   accessing enhancement image information h decticg either =, receptu
   processing said enhancement image based on said enhancement image information; and
   replacing said object in said scene with said processed enhancement image by rendering said processed enhancement image at said defined receptor site based on said enhancement image information.

23. The method of claim 22 wherein said step of recognizing an object further comprises:
   receiving an operator input.

24. The method of claim 22 wherein said step of recognizing an object further comprises:
   applying a pattern recognition process to said scene.

25. The method of claim 22 further comprising:
   determining a receptor site dimension, perspective, contour or illumination.

26. The method of claim 22 further comprising:
   comparing the image of said recognized object with a model of said object and determining a scale or illumination characteristic of said object.

27. A machine-readable medium having program code stored thereon which, when executed by a machine, causes the machine to perform a method for rendering an enhancement image onto a scene, the method comprising:
   detecting a receptor site for said enhancement;
   determining a size of said receptor site;
   selecting an enhancement image from a plurality of enhancement images based on said size of said receptor site;
   accessing enhancement image information;
   processing said enhancement image based on said enhancement image information; and
   rendering said processed enhancement image at said position of said receptor site based on said enhancement image information.

28. The machine-readable medium of claim 27, wherein the method further comprises:
receiving an input from an operator viewing said scene.

29. The machine-readable medium of claim 27, wherein the method further comprises:
applying a pattern recognition process to said scene.

30. The machine-readable medium of claim 27, wherein said the method further comprises:
scaling said enhancement image.

31. The machine-readable medium of claim 27, wherein the method further comprises:
rotating said enhancement image.

32. The machine-readable medium of claim 27, wherein the method further comprises:
warping said enhancement image.

33. The machine-readable medium of claim 27, wherein the method further comprises:
warping said enhancement image to conform to the contour of a recognized object.

34. The machine-readable medium of claim 27, wherein the method further comprises:
determines determining a coloration characteristic of said receptor site.

35. The machine-readable medium of claim 34, wherein the method further comprises:
applying said coloration characteristic to said enhancement image.

36. The machine-readable medium of claim 27, wherein the method for selecting said enhancement image further comprises:
a secondary selection process.

37. The machine-readable medium of claim 36, wherein said secondary selection process further comprises:
employing viewer demographic information in selecting said enhancement image.

38. The machine-readable medium of claim 36, wherein said secondary selection process further comprises:
employing viewer preference information in selecting said enhancement image.

39. The machine-readable medium of claim 36, wherein said secondary selection process further comprises:
employing price information in selecting said enhancement image.

40. A system for rendering an enhancement image onto a scene of pre-existing program content comprising:
first access means for accessing a program scene;
second access means for accessing receptor site information for said program scene, said receptor site information including a size of said receptor site;
selection means for selecting an enhancement image based on said size of said receptor site;
accessing means for accessing enhancement image information;
processing means for processing said enhancement image based on said enhancement image information; and
rendering means for rendering said processed enhancement image at said receptor site based on said selected enhancement image information.

41. An interactive television system programmed to perform the following steps:
receive a program scene;
access receptor site information for said program scene, said receptor site information including a size of said receptor site;
select an enhancement image based upon said size of said receptor site;
access enhancement image information;
process said enhancement image based on said receptor site information; and
render said processed enhancement image based on said enhancement image information.

42. The method of claim 1, wherein said enhancement image information further comprises an instruction for rendering said enhancement image.

43. The method of claim 1, wherein said enhancement image information further comprises an instruction for combining said enhancement image with program content.

44. The method of claim 1, wherein the enhancement image information further comprises an instruction for applying a property of the receptor site to the enhancement image.

45. The method of claim 1, wherein the enhancement image information further comprises an instruction for applying a property of the enhancement image to the receptor site.

46. The method of claim 1, wherein the enhancement image information further comprises an instruction for scaling or clipping.

47. The method of claim 1, wherein the enhancement image information further comprises control color information or reflectivity information.

* * * * *

UNITED STATES PATENT AND TRADEMARK OFFICE
CERTIFICATE OF CORRECTION

PATENT NO.       : 7,444,656 B2  
APPLICATION NO.  : 10/403317  
DATED            : October 28, 2008  
INVENTOR(S)      : Lemmons It is certified that error appears in the above-identified patent and that said Letters Patent is hereby corrected as shown below:

In column 13, line 7, in Claim 9, delete "characteristics characteristic" and insert -- characteristic --, therefor.

In column 13, line 47, in Claim 16, delete "pre-exist1ng" and insert -- pre-existing --, therefor.

In column 15, line 8, in Claim 30, delete "said the" and insert -- the --, therefor.

Signed and Sealed this

Twenty-fourth Day of February, 2009

JOHN DOLL  
*Acting Director of the United States Patent and Trademark Office*